June 5, 1951 L. C. HOSFIELD 2,555,409
HEAT SEALED RUFFLED ARTICLE
Filed Dec. 7, 1946 3 Sheets-Sheet 1
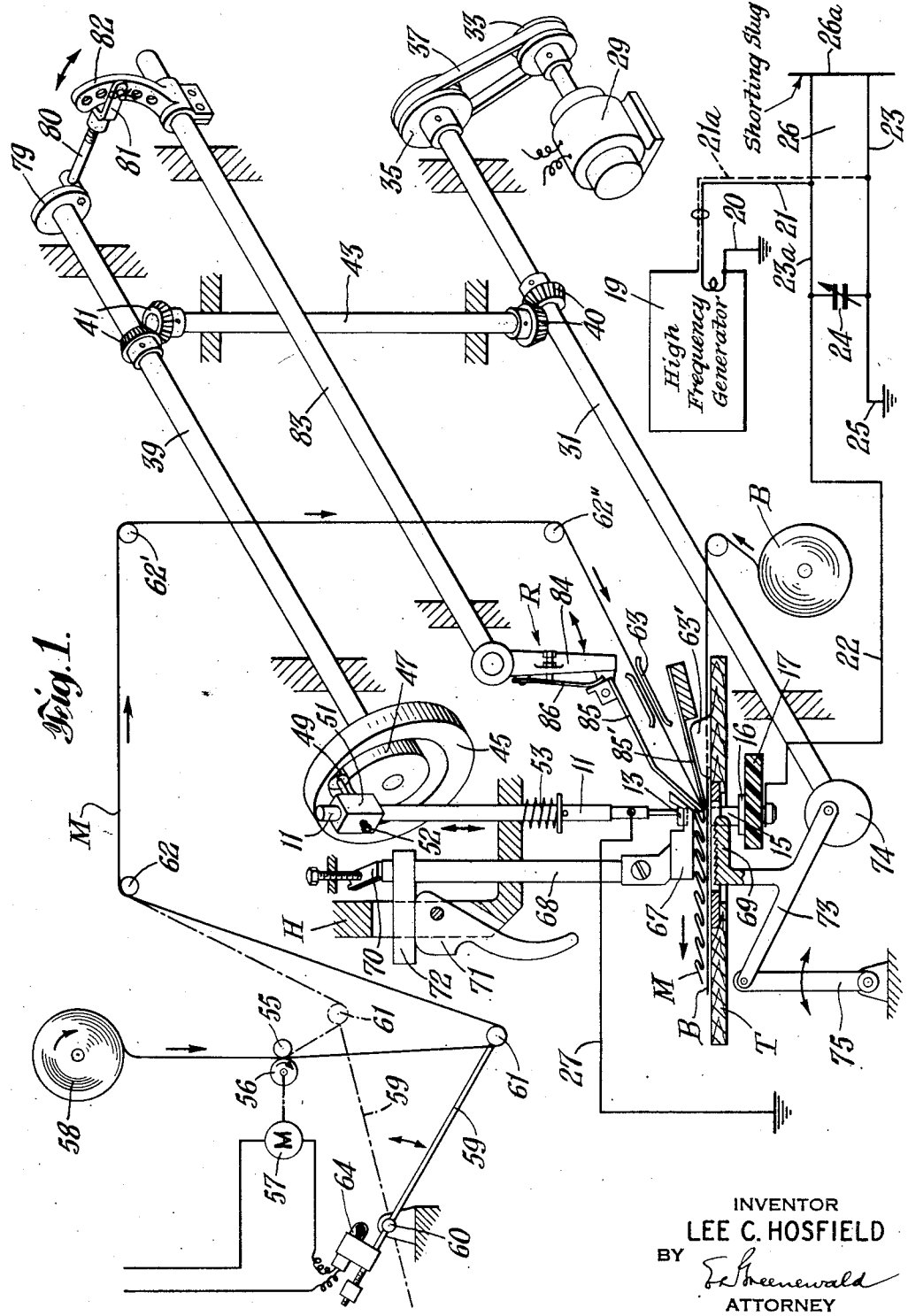
INVENTOR
LEE C. HOSFIELD
BY
*E. Greenewald*
ATTORNEY June 5, 1951 — L. C. HOSFIELD — 2,555,409
HEAT SEALED RUFFLED ARTICLE
Filed Dec. 7, 1946 — 3 Sheets-Sheet 2
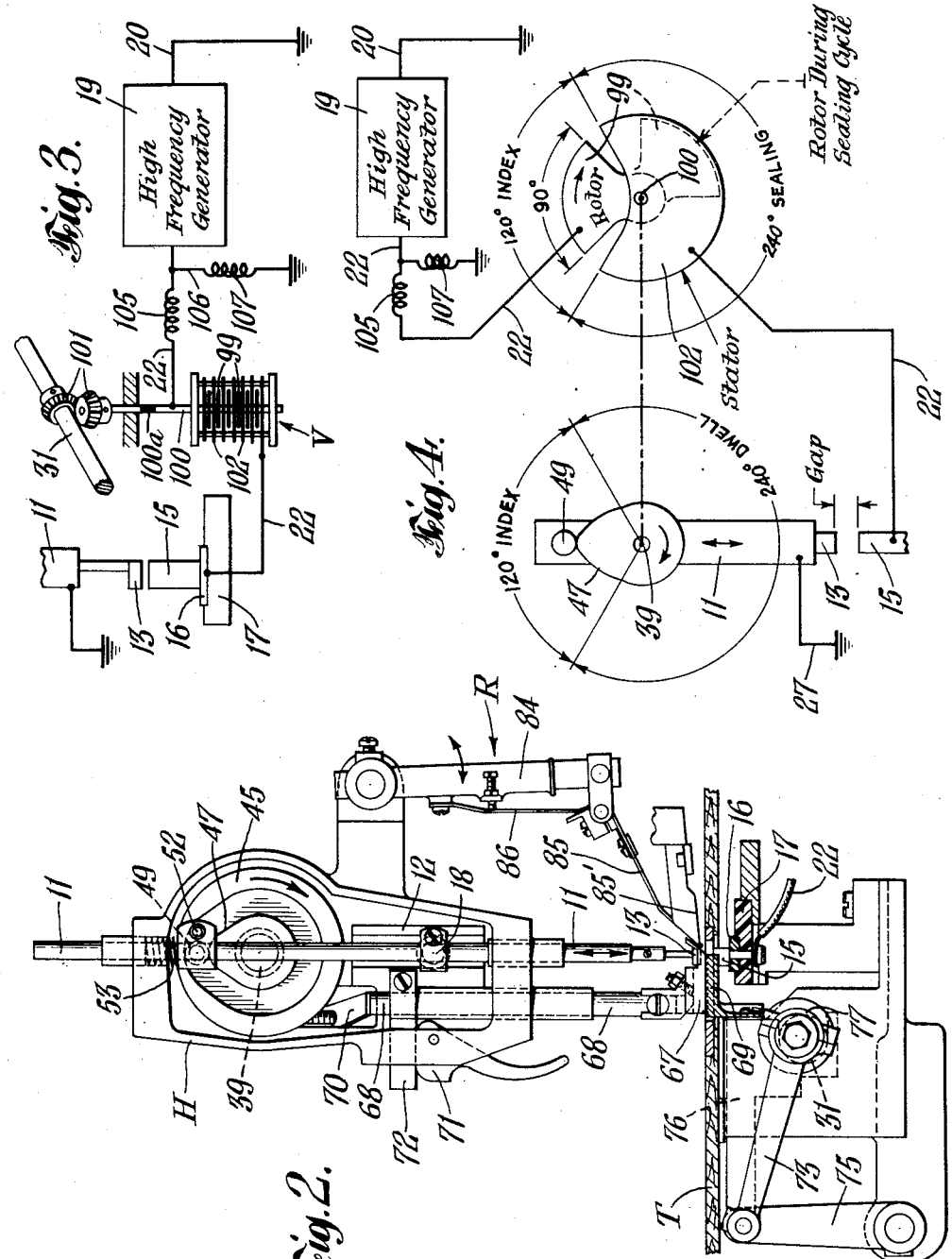
INVENTOR
LEE C. HOSFIELD
BY
ATTORNEY June 5, 1951        L. C. HOSFIELD        2,555,409
HEAT SEALED RUFFLED ARTICLE
Filed Dec. 7, 1946        3 Sheets-Sheet 3
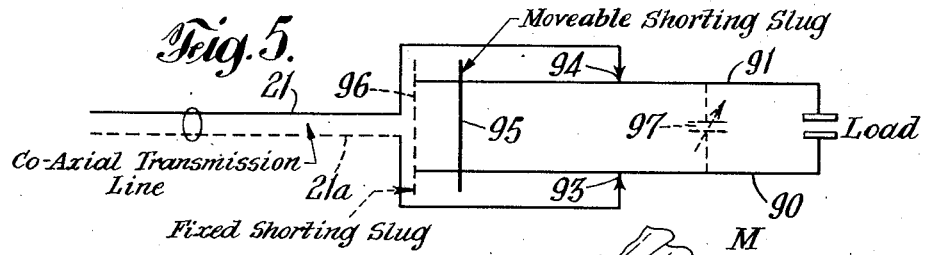
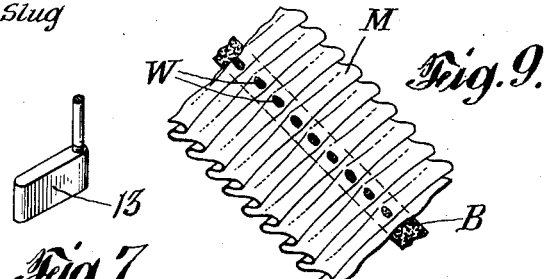
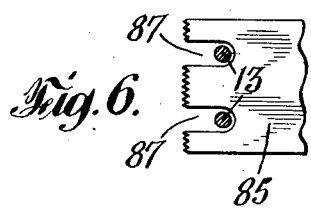
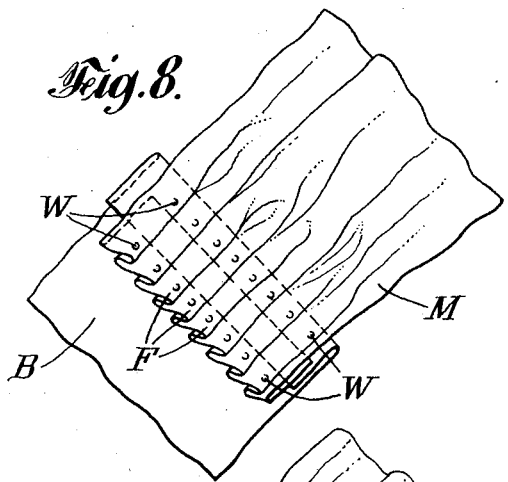
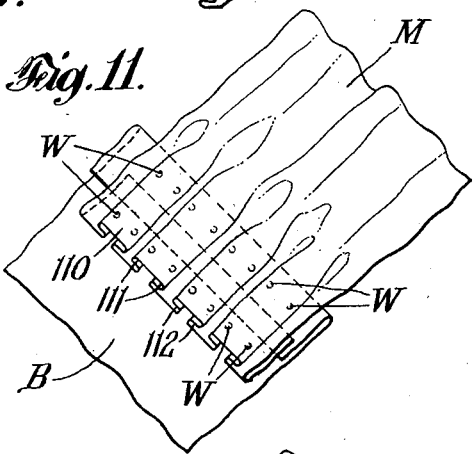
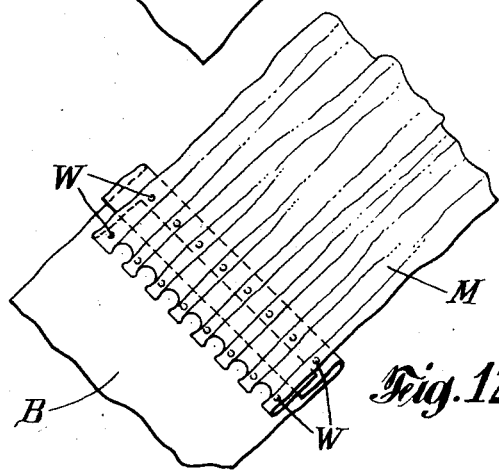
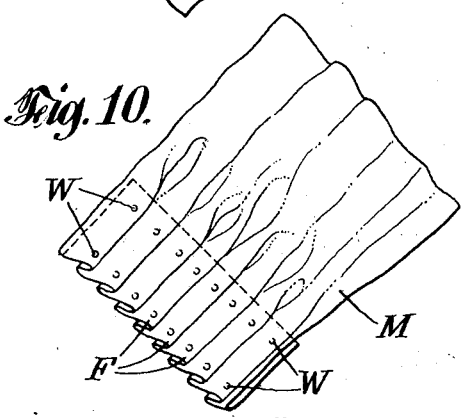
INVENTOR
LEE C. HOSFIELD
BY
ATTORNEY Patented June 5, 1951

2,555,409

UNITED STATES PATENT OFFICE 2,555,409

HEAT SEALED RUFFLED ARTICLE

Lee C. Hosfield, Bennington, Vt., assignor, by mesne assignments, to Union Carbide and Carbon Corporation, a corporation of New York Application December 7, 1946, Serial No. 714,832

12 Claims. (Cl. 154—43)

This invention relates to novel unitary heat-sealed ruffles and ruffled articles made from thermoplastic dielectric materials, and to a novel process and apparatus for making such unitary ruffles by spot-welding together successive folded-over portions of ruffled films, sheets, fabrics or other sheet-like elements of thermoplastic dielectric materials and, if desired, concurrently spot-welding successive folded-over portions of the latter articles to another sheet, film, fabric or other sheet-like element made from the same or another thermoplastic dielectric material.

A large variety of articles such as raincoats, aprons, umbrellas, window curtains, shower curtains, dry goods sundries and the like now are being made from thermoplastic resinous dielectric materials. In the manufacture of such articles it is common practice to unite the margins of two or more films by sewing the margins together, using thread of suitable material. Such operations involve the repeated puncturing of the sheeting by the fabricating needles at closely-spaced points, thereby weakening the material at and adjacent the seam. Moreover, the seam produced is stiff and incapable of yielding when subjected to stretching forces, so that sudden stresses sometimes tear the thread from the sheeting or break the thread after only a slight elongation of the films. This method of fabrication is not satisfactory, particularly for articles where strength, durability, or imperviousness to water or other liquids and gases is required.

For the purpose of providing a stronger article, processes have been developed whereby sheets or films to be united have flat overlapping margins pressed together to form a seam while being heated to suitable temperatures. Heat and pressure are applied by means of heated cooperating pressure rolls to form a continuous welded seam.

In recent years the so-called electronic method of heating has assumed importance as a source of the welding heat. Opposed pressure rolls serve as rotating electrodes in a high frequency electric circuit. The thermoplastic dielectric materials, while continuously pressed between the electrodes, are subjected to a high frequency electric field, thereby being softened and welded together. Continuous narrow welded areas which readily are visible are thus formed. Such methods require that the sheets to be united are of uniform thickness and free from wrinkles, etc.

There are a wide variety of articles made from thermoplastic dielectric materials which, to be satisfactory for the intended use, require the affixing to a sheet, film or fabric made of or containing a coating of a thermoplastic dielectric material, of ruffles of the same or an equivalent material. Among such articles may be mentioned window curtains, shower curtains, aprons and other articles of wearing apparel, shelf and table decorative strips and covers, and the like. There also is a demand for unitary ruffled articles made from such dielectric materials.

It is highly important that such ruffled articles have an attractive appearance and be of a uniform construction. The ruffled structure must be strong, tough, permanent, and sufficiently elastic to yield when subjected to tensile or to puncturing forces without being injured or destroyed. The present invention is concerned with such a ruffled article and with the novel method and apparatus for its production.

Among the more important objects of the invention are the following: to provide a novel unitary ruffled article made entirely of thermoplastic dielectric material; to provide an unperforated heat-sealed ruffle or ruffled article of dielectric material, and one which is free from restricting threads of dissimilar material; to provide a ruffled article wherein the sides of each ruffled area formed in a dielectric thermoplastic material are permanently united to each other and to an adjacent ruffled area, and, if desired, to a base sheet, by a plurality of spot welds to provide a ruffled composite article wherein each individual fold of the ruffle is of uniform size and is spot welded to the base sheet and to an adjacent fold at one or more spaced points of limited area; to provide such a unitary heat-sealed ruffled article which can be elongated more than 90% of its original length without rupturing the ruffled structure or the seam; to provide heat-sealed ruffles having stronger bonds between the base sheet and the ruffle and greater resilience along the line of the ruffle than ruffled articles made by sewing with thread; to provide novel ruffled articles wherein repairs to the ruffles can be made merely by spot-welding without loss of the ruffled material; to provide in novel manner for the production at high rates of thermoplastic sheet-like articles having permanently united therewith strong welded-on ruffles, uniform and pleasing in appearance, and having good physical properties; to provide a novel process and apparatus for continuously producing thermoplastic articles having welded-on ruffles while preventing injury to the ruffled material; to provide a novel process and apparatus for welding ruffles of a dielectric material upon a base sheet of such a material by means of a high frequency electric field, while inhibiting arcing at the electrodes and burning of the material; and to provide in novel manner for the continuous spot-uniting of ruffled sheets, films, fabrics or the like made from or containing dielectric thermoplastic materials with other sheets, films, or fabrics made from or containing the same or other thermoplastic dielectric material, either plasticized or unplasticized, or made from paper, cloth and like materials coated with such a dielectric material.

The invention has especial utility for the production of strong, permanent, yielding ruffles and ruffled articles having elastic properties made from such plasticized thermo-plastic materials as the cellulose esters and ethers, such as cellulose acetate, viscose, regenerated cellulose and ethyl cellulose; vinyl resins, such as the polyvinyl chlorides, the polyvinyl acetates, copolymers of vinyl chloride and vinyl acetate, polyvinylidene chloride resins, polyvinyl alcohol resins, polyvinyl acetal resins, polymethacrylate resins, and copolymers of vinyl halides and acrylic compounds, such as copolymers of vinyl chloride with acrylonitrile, with acrylic acid, and with the acrylic acid lower alkyl esters; copolymers of butadiene with styrene and with acrylonitrile; and resinous reaction products of a diamine and a dicarboxylic acid.

A preferred form of the novel articles of the invention generally involves a base sheet, film, fabric or other sheet-like element of a thermoplastic synthetic resin or other dielectric material which is permanently united by one or more series of spaced spot welds with a sheet-like element of the same or other thermoplastic dielectric material having the form of a continuous succession of interconnected folds or ruffles of uniform size and shape. The respective sides of each folded area are permanently united with each other, with a side of the next adjacent folded area, and with one or more layers of the base sheet by means of at least one spot weld, and preferably two welds, covering a small portion of each such folded area. Since the individual folds are not secured by restricting non-elastic sewed threads, the entire body of the welded ruffle or the composite article is free to yield under tension and to elongate or stretch, the extent of such elongation being dependent upon the character of the material from which the sheet-like elements are made, the number, area and character of the spot welds, and upon other factors. In the case of articles made from sheets of vinyl resins, such as those produced by the copolymerization of a vinyl halide with a vinyl ester of a lower aliphatic acid—e. g., a vinyl chloride-vinyl acetate copolymer containing between 70% and 95% of the chloride in the polymer—the heat-sealed ruffled article can be elongated more than 90% of its original length without rupturing the welded seam and, when tension is released, will regain its original length. The bond between the base sheet and the ruffled sheet is from 60% to 90% stronger than that secured in the same article by sewing with thread.

Since each of the folds is unrestricted by threads, the peak of each fold is free to pucker outwardly from the base sheet and to give to the ruffled article a uniform, pleasing appearance. The folded areas are not noticeably deformed by the welding heat and pressure used.

If, when such a ruffled article is subjected to excessive stress, one or more of the spot welds fails, the ruffles still are held in place and the appearance and the strength of the ruffled structure are preserved by the remaining spot welds adjacent those which failed.

The novel ruffled articles are made, in accordance with a preferred form of this invention, by a novel process and apparatus which forms a rapid succession of similar ruffles or folds of the desired size and shape in a sheet-like element of suitable dielectric material and, as rapidly as each such ruffle or fold is formed, the sides of such fold are permanently spot-welded to each other and to a surface of a next adjacent fold, and preferably to one or more layers of a suitable sheet-like base element, at from one to two or more spaced points of limited area in such fold. The welding is effected by the use of localized heat and pressure. The heat is produced locally in the material at each successive folded area by bringing such areas between two electrodes to which a high frequency electric current of suitable voltage is applied, as hereinafter more particularly described.

In the accompanying drawings wherein are illustrated certain preferred forms of the invention, Fig. 1 is a diagrammatic view of one form of apparatus of the invention, parts being omitted;

Fig. 2 is a side elevation of one form of heat-sealing machine showing the electrodes, electrode reciprocating mechanism, and associated parts, parts being broken away, and other parts being omitted;

Fig. 3 is a schematic wiring diagram of another high frequency heating circuit and associated parts;

Fig. 4 shows diagrammatically the relationship between the actuating cam for the reciprocating electrode and the rotary tuning device of Fig. 3;

Fig. 5 illustrates two alternate forms of tuning stubs or impedance matching means for the high frequency heating circuit;

Fig. 6 is a fragmentary plan view of a folding and indexing blade for forming the ruffles;

Fig. 7 is a perspective fragmentary view of a reciprocatable electrode and operating stem;

Fig. 8 shows one preferred form of ruffled composite article of the invention;

Fig. 9 shows another form of the ruffled composite article;

Fig. 10 shows a unitary ruffled heat-sealed strip reinforced by a folded-over end margin; and Figs. 11 and 12, respectively, show other forms of composite ruffled articles of the invention.

Referring to Figs. 1 and 2 of the drawings, the apparatus comprises an operating head H which conveniently may be mounted on a table T, generally similar to the operating head and table of the standard type of sewing machine. Secured to the lower end of a member 11 mounted on the head H for longitudinal reciprocation are one or more upper electrodes 13 adapted to cooperate with corresponding stationary lower electrodes 15 aligned therewith and formed on an electrode plate 16 secured below the table top in suitable manner and insulated from the latter by a plate 17 of a dielectric material such as polystyrene. A rider 18 secured to member 11 slides in a groove in a guide member 12 and prevents turning of the member 11.

For passing a high frequency electric current through a plurality of layers of one or more sheets of thermoplastic organic dielectric material while in the space between the electrodes to heat such material to a welding temperature, the electrodes are in a high frequency electric circuit which comprises an oscillator or generator 19 or other source of high frequency electric current. One terminal of the high frequency output line is grounded through a line 20. The other terminal is connected with the stationary electrode plate 16 through a coaxial transmission line, the outer conductor 21a of which terminates in the outer tube 23 of a tuning stub 26 such as shown in Fig. 5. The inner conductor 21 terminates in a coaxial inner rod 23a of the stub 26. A coaxial variable capacitance 24 connects the tube 23 and rod 23a within the said tube. Tube 23 is grounded through line 25. A short circuiting member 26a fixes the length of the short circuited stub. The electrode 13 is grounded through a flexible strap 27.

For reciprocating each electrode 13 in a fixed path toward and from a corresponding stationary electrode 15, a standard electric motor 29, equipped with a magnetic brake for instantaneous starting and stopping and of a type commonly used on industrial sewing machines, drives a rotatable shaft 31 through pulleys 33 and 35 and V-belt 37. Shaft 31 drives an upper shaft 39 through pairs of beveled gears 40, 40, and 41, 41, and vertical shaft 43. Secured upon one end of shaft 39 is a cam plate 45 having a groove in one face providing a cam surface 47. A cam follower 49 is mounted for rotation on a pin secured upon a follower block 51. The latter is secured for vertical adjustment upon reciprocatable rod 11 and has rigidly connected therewith the electrode or electrodes 13. By means of a set screw 52 in block 51 the latter can be secured at a selected point along the rod 11 and thus determine the pressure applied upon the thermoplastic material by each electrode 13 when the latter is in the lowermost position during a spot-welding operation. A compression spring 53, operatively interposed between a pin or flange on rod 11 and a fixed part of the operating head H, continuously exerts a downward pressure upon the reciprocating rod during operation and prevents backlash.

For feeding a strip or sheet of dielectric material M from a source of supply thereof and for forming a succession of ruffles or folds therein adjacent the welding or heat-sealing zone a pair of feeder rolls including an idler roll 55 and a roll 56 driven by a motor 57 draw a sheet of such material from a supply roll 58. The sheet then is directed around a dancer roll 61 and idler rolls 62, 62' and 62" and thence between a fixed margin fold-over guide 63. It then is moved intermittently to the welding zone between the electrodes 13, 15, by means of a ruffling mechanism R. The dancer roll 61 is rotatably mounted upon an end of a rod 59 which is pivoted about a fulcrum 60. Mounted on the end of rod 59 opposite roll 61 is an adjustable counterweight, and a mercury switch 64 of well-known type having terminals connected in the electrical circuit driving motor 57. The arrangement is such that when the roll 61 is in the position shown in full lines in Fig. 1, the switch 64 cuts off current to motor 57, and that when roll 61 is in the position shown in broken lines the switch closes the circuit and drives motor 57. Thus, any differences between the rate of unwinding of material from the supply roll and the rate demands of the ruffling mechanism are equalized.

For feeding a sheet M, with or without a base sheet or film B, of thermoplastic dielectric material between and past the electrodes at a welding or heat-sealing zone, a resiliently mounted presser foot 67 cooperates with a vertically and laterally movable feed dog 69 while pressingly engaging the sheets interposed therebetween. The feed dog has a serrated surface area adapted intermittently to contact the underside of the ruffled sheet or the composite sheet B and move the same to the left in Fig. 1 away from the welding zone. Thereafter the feed dog is depressed and withdrawn from contact with such sheet and moved to the right toward the welding zone. For effecting such feed of the sheet or sheets the presser foot 67 is secured to a rod 68 mounted on the head H for movement toward and from the feed dog 69. An adjustable compression spring 70 presses the foot 67 upon the sheets lying upon the feed dog under a selected pressure. A cam member 71 pivoted on the head H cooperates with a member 72 secured to rod 68 for raising and lowering the rod 68 and for locking it in raised position. For effecting intermittent movement of the feed dog and the sheets lying between it and the presser foot in a direction from the welding zone, as shown diagrammatically in Fig. 1, the feed dog 69 is secured to an arm 73 which is connected with a crank 74 secured upon the shaft 31. The crank arm 73 is pivoted upon an end of a rocker arm 75, the other end of which is pivotally connected with a fixed support. In the form shown in Fig. 2, the feed dog is secured to a plate 76 which has an end pivotally secured to the arm 75. A cam member 77 mounted on shaft 31 cooperates with a cam groove in the plate 76 during rotation of the shaft. The cam member is pivotally connected with arm 75 through arm 73. During operation of motor 29 the rotation of shaft 31 and crank 74 causes the feed dog 69 successively (1) to rise vertically and engage the sheet M or B, (2) to move to the left to index the ruffled article, then (3) to retract downwardly from the sheet and (4) to move toward the right while disengaged from the latter; and to repeat this cycle of motions for every rotation of shaft 31. The movement of feed dog 69 is timed so that it advances the ruffled article to the left a selected distance just before each forward movement of the fold-indexing mechanism to be described.

For forming in sheet M a succession of ruffles of uniform size and spacing at a uniform rapid rate, a crank plate 79 secured upon shaft 39 is operatively connected, by means of a rod 80 and a clevis 81 with a lever arm 82 secured upon a rocker shaft 83 suitably supported on the operating head. When shaft 39 is rotated the rocker shaft 83 oscillates through a selected arc, depending upon the position of clevis 81 along the arm 82 maintained by means of a clevis pin cooperating with one of the apertures in arm 82. Secured to an end of rocker shaft 83 is a lever arm 84 which supports an adjustable folding and indexing blade 85. The latter is pivoted upon ears formed on the lever arm 84, and has a rear flange portion cooperating with a spring 86 carried by that arm to urge the blade 85 downwardly against the sheet of material under a regulated tension. The forward end of the blade has a serrated margin and has therein slots 87 (see Fig. 6) adapted to accommodate the electrodes 13, 13. The arrangement is such that blade 85 is held in retracted position to the right (see Fig. 2) away from the electrodes 13 during the welding part of each cycle of operation, and then advances to the left during the part of the cycle when electrodes 13, 15 are held apart, thereby moving fresh sheet material into position between the spaced electrodes and forming therein a fold or pleat. A stationary serrated blade 85' prevents retraction of the sheet M when blade 85 is retracted, and prevents folds being formed in sheet B. A folder guide 63' adjacent the folder guide 63 folds over a margin of the base sheet as it moves to the welding zone.

The fold or pleat produced can be varied in size, and the number of folds or pleats per inch can be regulated by the adjustment of the length of stroke of the arm 84. To increase or to reduce the number of folds per inch, clevis 81 is connected with arm 82 at a point further from or nearer to shaft 83, respectively. Preferably the adjustment is such that from six to eight ruffles or folds per inch are produced, although articles having from four to twelve folds per inch readily are made. However, the ruffled areas should be at least one-sixteenth of an inch in width in order to insure the spot-welding of each ruffle at one or more spaced points even in instances where some stretching of the material results from action of the folder blade 85 or of the feeder foot 69.

The actual welding portion of each cycle of operation, during which the electrodes 13, 15, or respective pairs thereof, exert pressure upon the folded-over portions of the ruffle material, and upon the base sheet when present, constitutes about three-fourths of the cycle and is governed by the shape of the cam surface 47. The welding of the ruffled article is accomplished during this time by passing through the layers of material at the spot-welding zone between the electrodes a high frequency current of from 10 to 500 megacycles and at suitable voltages, e. g., around 1,000 volts at 60 megacycles.

In the form of the invention illustrated in Fig. 1 using frequencies of 50 to 500 or more megacycles, the tuning stub 26 of standard construction, the variable capacitance 24 and the interconnecting lines define a matching circuit having impedance that can be varied to accommodate various load impedances and to provide maximum power transfer to the work.

Tuning stubs of the type shown in Fig. 5 are particularly useful as matching sections when employing frequencies of around 100 to 200 or more megacycles. Such tuning stubs are in the form of a coaxial transmission line connected with the high frequency generator. The outer conductor of the coaxial line is a brass tube 90 and the inner conductor is a brass rod 91. Two brass sleeves 93, 94, serve as terminals of the transmission line, one sleeve sliding upon the outer conductor 90 and the other sliding on the inner conductor 91. The length of the short circuited portion is adjusted by means of a brass disc 95 which slides along the inside of the outer tube but also contacts the inner rod 91. The length of the load end is adjusted by sliding the respective terminals 93, 94 along the tube and rod.

In another form of tuning stub illustrated in Fig. 5, the movable shorting disc 95 is replaced by a fixed shorting disc 96 (shown in dotted lines in Fig. 5), so that the length of the short circuited stub is fixed. The points of the transmission line termination at the tube and rod also are fixed. A coaxial variable capacitance 97 (shown in dotted lines) is set within tube 90 and is connected across the conductors 90, 91.

Fig. 3 illustrates schematically a form of circuit particularly useful with frequencies of around 50 to 100 megacycles. It effectively prevents arcing at each electrode 13 as the latter is rapidly withdrawn from the welding zone, by throwing the high frequency circuit out of resonance from a time just prior to the withdrawal of electrode 13 from pressing contact with the work until after the electrode is in contact with another ruffle in the next succeeding cycle of operation.

If desired, the circuit can be detuned in various ways during such period of each cycle to accomplish this purpose. In the form of the invention shown in Figs. 3 and 4, the circuit comprises a high frequency generator 19 having one terminal 20 grounded and having its other terminal connected in series through line 22 with a fixed inductance 105, a variable condenser V and the lower electrode plate 16. A line 106 having therein a fixed inductance 107 connects line 22 to ground. The condenser V has segmental rotor plates 99 subtending an arc of 90°, mounted upon a rotatable shaft 100 having an electrically insulated portion 100a and driven from shaft 31 through a pair of bevel gears 101. The condenser has fixed plates 102 with cutaway segmental portions somewhat greater than the width of segmental plates 99, and preferably subtending an arc of 120°.

Fig. 4 more clearly indicates the function of the detuning variable condenser, wherein it is shown in full lines in the position during which a fold is being formed and moved into position between the electrodes and the high frequency circuit is out of resonance. One position of the plates 99 during the welding stage of each cycle is indicated in broken lines. The use of this condenser permits the use of optimum voltage during the welding stage of each cycle, while limiting the voltage during the balance of the cycle to one insufficient to cause arcing or burning of the materials.

Fig. 4 also illustrates the general shape of the rotary cam 47 which, in conjunction with spring 53, controls the reciprocation of rod 11, and the period of its dwell in a position with electrode 13 in welding position. As shown, this cam and the cam follower 49 raise and lower electrode 13 in a vertical pattern during one-fourth of a cycle, and then, with the aid of spring 53, hold the electrode in pressure contact with the ruffied material during the balance of each cycle. Through correlation of the timing of the respective movements of the cam 47, the folder blade 85 and the feeder foot 69, the successful production of welded ruffled articles having eight ruffles per inch, each ruffle being concurrently spot-welded in two zones, has been accomplished at the rate of 34 feet per minute. This corresponds to the production of 3,264 single welds per minute or, when using two pairs of electrodes, 6,528 welds per minute.

In performing the process using the apparatus of Figs. 1 and 2, the leading ends of the respective base sheet B and ruffle element M are placed in mutual contact above the feeder foot 69 and between the electrodes, and motor 29 is started. The motor concurrently actuates the feeder foot 69, reciprocates the electrode 13, and oscillates the folder blade 85. Each cycle of operations, during a revolution of cam 47, is as follows: While electrodes 13 are raised from the work the presser foot 67 cooperates with feed dog 69 and holds the several thicknesses of sheets while the ruffler blade 85 scuffs in the ruffle sheet M a fold perpendicular to the direction of feed. Thereafter, while the blade holds the fold in place the upper electrodes 13 descend upon the fold and hold it, under pressure from spring 53, while the blade 85 is retracted. The radio frequency voltage impressed upon the electrodes causes current to flow through the two walls of each of the one or more layers of material forming the folded area in sheet M and through each layer of the base sheet B, softening the material and spot-welding these parts together at one or more, and preferably two, small spaced welding zones defined by the electrodes, the degree of welding heat depending upon the voltage across the electrodes. The electrodes 13 then are raised, thereby releasing the welded sheets. The feed dog and presser foot then advance the work to make room at the welding zone for the next ruffle. The parts are so synchronized that the ruffler blade 85 is in retracted position while the weld is being made, and that the feed dog 69 has completed its action advancing each welded ruffle before the ruffler blade forms the next succeeding ruffle.

The apparatus of Figs. 3 and 4 function similarly to that of Fig. 1, with the exception that immediately prior to retraction of the electrodes 13 from the welding position the high frequency heating circuit is detuned by movement of plates 99 of the variable condenser V into the position shown in full lines in Fig. 4, thereby reducing the voltage between the electrodes and preventing arcing at the electrodes. The circuit remains in the detuned condition until the blade 85 has formed another fold and each electrode 13 has moved into pressing contact with the upper surface of the newly folded area.

Variations in the rate of application of energy to the material during the different stages of each cycle of operations also can be effected by modulating the oscillator tube in the high frequency generator, or in any other well-known manner.

One preferred form of spot-welded ruffled article is illustrated in Fig. 8. In that figure the two sides of each layer of material forming each of the ruffles or folded areas F in the sheet M, one side of each layer forming an adjacent folded area F, and one or more layers of the base sheet B are permanently united by two spaced spot welds W of any suitable shape and size. The material at the unwelded portions of each folded area is unrestrained and free to assume a rounded shape throughout the remainder of the length of each fold. All portions of the ruffled thermoplastic article are free to yield or stretch under any tension exerted either longitudinally or laterally of the rows of spot welds formed. By employing a folder guide 63 for folding over the margin of sheet M, and/or a folder guide 63' for folding over a margin of sheet B (see Fig. 1), each spot weld units from four to six or more thicknesses of the thermoplastic material, as shown in Fig. 8. Preferably, the folded-over marginal portions of both the sheets M and B are of sufficient depth that each of the welds formed in a ruffle unites the same number of layers of dielectric material as the other weld or welds.

The tiny but tough spot welds enhance the appearance of the ruffled article while at the same time providing adequate strength, and preserving in such article the normal resilience of the thermoplastic material from which the sheeting is made, unrestrained by extraneous materials having properties differing therefrom, such as non-yielding threads. All portions of each sheet M and B are entirely free from perforations and other sources of weakness.

Fig. 9 illustrates a form of the invention wherein each of one or more layers of a sheet-like element of a dielectric material has formed therein a succession of closely-spaced folded areas throughout its width and wherein each of one or more layers of a relatively narrow sheet-like base of a dielectric material is permanently united with each of said folded areas by means of one spot weld located midway between the margins of the sheet-like element. By the use of a somewhat wider sheet-like base, two or more spot welds can be made in each folded area. By using a sheet-like base and sheet-like element of different colors, attractive color effects and the effect of sewing or gathering with colored threads are secured at each spot weld due to the color of the base showing through to the surface of said sheet-like element. Thus, a ruching or double-ruffle effect is secured in a unitary article. If desired, two or more narrow, longitudinally-spaced, sheet-like bases may be united with the sheet-like element.

Permanent unitary ruffles may be made from single sheet-like elements. Thus, in one form of the invention illustrated in Fig. 10, by using only the sheeting M, the latter is provided with a ruffled margin wherein each fold is spot-welded in place, the welding uniting the two sides of each ruffled or folded area to each other and to a side of an adjacent folded area. The resultant product may be stored or used as such, or later may be united with a second sheet or film such as the sheet B, in a separate spot-welding or other operation.

Fig. 11 illustrates another form of ruffle which can be produced in accordance with the invention. The ruffles are produced by well-known folder attachments now in use on standard sewing machines. Here each of the one or more rows of spot welds W unites portions of the sheet M at folded areas through three or more thicknesses of the dielectric material. Each folded area consists of a relatively flat mid-portion 110, two inwardly sloping end portions 111, and two outwardly flaring portions 112, the respective portions being welded together by spaced spot welds arranged in one or more rows. A base sheet B may be spot-welded to the folded sheeting, as in the case of the article shown in Fig. 8.

Fig. 12 illustrates still another form of ruffled article made with the use of the invention in connection with standard ruffling equipment. Here the base sheet B and the ruffled sheet M are spot-welded at one or more spaced points W lying between adjacent ridges.

It will be understood that the invention is not limited to the ruffled articles specifically described, nor to the particular form of the process and apparatus for making the same described. On the contrary, numerous modifications are possible within the scope of the appended claims, whereby a unitary permanent ruffled article is made, and especially one wherein the sides of each ruffled area of each of one or more sheets are spot-welded together and to an adjacent folded area of such sheet at one or more spaced points, and, if desired, to one or more base sheets, and wherein the remainder of the sheet or sheets at each ruffled area is substantially unconfined and is free to yield or stretch under stress.

Either or both of the sheet-like elements of thermoplastic dielectric material may be replaced by a sheet-like element of a non-thermoplastic fibrous material in the form of a woven, knitted, felted or other fabric impregnated or coated with a thermoplastic dielectric material, and the ruffles formed and spot-welded in the manner herein-described. Thus, a woven or knitted fabric made from yarns of cotton, wool, silk, glass or the like may be impregnated and/or coated in whole or in part with a film or body of a vinyl resin or other thermoplastic dielectric material hereinbefore mentioned. Such composite article then is converted into the form of a welded ruffle or, if desired, is concurrently ruffled and secured to another element of a thermoplastic dielectric material or of a non-thermoplastic material coated with a thermoplastic dielectric material by welding in the manner described. Also useful as the sheet-like elements and/or bases are the composite fabrics made from yarns formed by compositing filaments or fibers of a non-thermoplastic material such as cotton, etc., with filaments or fibers of a plasticized thermoplastic dielectric material.

The term "sheet-like element" and similar expressions used in the claims are intended to designate sheets, films, webs, batts, and woven, knitted and other fabrics which are relatively small in one dimension.

I claim:

1. A unitary permanent ruffled article comprising a sheet-like element of a thermoplastic dielectric material, a portion of such element within a selected area thereof being folded on itself to form a succession of interconnected ruffles, the material forming the respective sides of each folded area being permanently united by at least one spot weld produced by heat and pressure in a limited zone within each such folded area.

2. A unitary permanent ruffled article comprising a sheet-like element of a thermoplastic dielectric material, said element having formed therein within a selected area a succession of folded areas, the respective sides of the element forming each such folded area being permanently united to each other and to a side of the next adjacent folded area by means of at least one spot weld formed by heat and pressure, the major portion of each folded area being unrestrained and free to yield under the action of stretching and puncturing forces.

3. A unitary permanent ruffled article comprising a sheet-like element of a thermoplastic dielectric material having at least one marginal portion folded upon itself to form a multi-layer folded-over portion, a selected area within such folded-over portion being further folded to form a succession of interconnected folded areas embracing the said folded-over portion, the layers of material forming the respective sides of each folded area being permanently united to each other by at least one spot weld produced by heat and pressure in a limited zone lying wholly within such folded area.

4. A unitary permanent ruffled article comprising a sheet-like element of a thermoplastic dielectric material having at least one marginal portion folded upon itself to form a multi-layer folded-over portion, a selected area within such folded-over portion being further folded to form a succession of closely-spaced interconnected folded areas within said folded-over portion, the layers of material forming the respective sides of each folded area being permanently united to each other and to a side of a next adjacent folded area by at least one spot weld produced by heat and pressure.

5. A unitary permanent ruffled article comprising a sheet-like element of a thermoplastic dielectric material, and permanently united with at least one layer of such element at least one layer of a sheet-like base of a thermoplastic dielectric material, said sheet-like element having a succession of closely-spaced folded areas, the said element and said base being permanently united at each of said folded areas by means of at least one spot weld, the major portion of each folded area being free to yield under the action of stretching and puncturing forces.

6. A unitary permanent ruffled article comprising at least one layer of a sheet-like element of a thermoplastic dielectric material having formed therein a succession of closely-spaced folded areas, and at least one layer of a relatively narrow sheet-like base of a thermoplastic dielectric material, the said element and said base being permanently united at a mid-point of each such folded area by means of at least one spot weld, each folded area and the base being free to yield under the action of stretching and puncturing forces.

7. A unitary permanent ruffled article comprising a sheet-like element of a thermoplastic dielectric material, and permanently united with at least one layer of such element at least one layer of a sheet-like base of a thermoplastic dielectric material, said sheet-like element having at least adjacent one margin thereof a succession of folded areas, the said element and said base being permanently united at points between adjacent folded areas by means of at least one spot weld, each such folded area being free to yield under the action of stretching and puncturing forces.

8. A unitary permanent ruffled article comprising a sheet-like element of a thermoplastic dielectric material, and permanently united with at least one layer of such element at least one layer of a second sheet-like element of a thermoplastic dielectric material having at least adjacent one margin thereof a succession of folded areas, the respective sides of each such folded area being permanently united to each other and to the first-named sheet-like element by means of at least one spot weld lying wholly within each such folded area and formed by heat and pressure, the major portion of each folded area being free to yield under the action of stretching and puncturing forces.

9. A unitary permanent ruffled article comprising a sheet-like element of a thermoplastic dielectric material having permanently united with at least one layer of such element at least one layer of a second sheet-like element of a thermoplastic dielectric material having adjacent one margin thereof a succession of folded areas, the sides of each such folded area being permanently united to each other, to a side of the next adjacent folded area and to the first-named sheet-like element by means of at least one spot weld covering only a portion of the width of such folded areas, the major portion of each such folded area being free to yield under the action of stretching and puncturing forces.

10. A unitary permanent ruffled article comprising a sheet-like element, at least one surface of which element comprises a thermoplastic dielectric material, at least a portion of such element within a selected area thereof being folded on itself to form a succession of interconnected ruffles, the material forming the respective sides of each folded area being permanently united by at least one spot weld confined within a limited zone within each such folded area.

11. A unitary permanent ruffled article comprising a sheet-like element, a surface of which includes a thermoplastic dielectric material, and permanently united with at least one layer of such element at least one layer of a sheet-like base having a surface which includes a thermoplastic dielectric material, said sheet-like element having therein a succession of closely-spaced folded areas, the said element and said base being permanently united at each of said folded areas by means of at least one spot weld covering only a portion of the width of each such folded area, the major portion of each folded area being free to yield under the action of stretching and puncturing forces.

12. A unitary permanent ruffled article comprising a sheet-like element of a thermoplastic dielectric material, and permanently united with such element at least one layer of a sheet-like base of a thermoplastic dielectric material having a color other than that of said sheet-like element, such element having a succession of closely spaced folded areas, the said element and said base being permanently united at each of the said folded areas by means of at least one spot weld having a cross-section substantially less than the width of the folded area, whereby the color of the said base shows through to the surface of said sheet-like element at said welded areas, the major portion of each folded area being free to yield under the action of stretching and puncturing forces.

LEE C. HOSFIELD.

REFERENCES CITED

The following references are of record in the file of this patent:

UNITED STATES PATENTS

| Number | Name | Date |
| --- | --- | --- |
| 1,049,680 | Dahl | Jan. 7, 1913 |
| 1,094,707 | De Voe | Apr. 28, 1914 |
| 1,571,654 | Tiedemann | Feb. 2, 1926 |
| 1,698,275 | Plaat | Jan. 8, 1929 |
| 2,121,013 | Brown | June 21, 1938 |
| 2,143,844 | Daller | Jan. 17, 1939 |
| 2,158,762 | Phelan | May 16, 1939 |
| 2,253,077 | Kierner | Aug. 19, 1941 |
| 2,322,298 | Johnston | June 22, 1943 |
| 2,367,725 | Lindh | Jan. 23, 1945 |
| 2,392,598 | Lewis | Jan. 8, 1946 |
| 2,432,412 | Hacklander | Dec. 9, 1947 |

FOREIGN PATENTS

| Number | Country | Date |
| --- | --- | --- |
| 573,513 | Great Britain | Nov. 23, 1945 |

OTHER REFERENCES

Hoyler: An Electronic "Sewing Machine," reprint from the August 1943 issue of Electronics (7 pages).